United States Patent [19]

Tuggle

[11] 4,370,855
[45] Feb. 1, 1983

[54] MUFFLER FOR PORTABLE ENGINE
[75] Inventor: Lloyd H. Tuggle, Shreveport, La.
[73] Assignee: Emerson Electric Co., St. Louis, Mo.
[21] Appl. No.: 185,251
[22] Filed: Sep. 8, 1980

Related U.S. Application Data

[63] Continuation-in-part of Ser. No. 51,950, Jun. 25, 1979, Pat. No. 4,286,675.
[51] Int. Cl.³ .......................... F01N 3/02; F01N 1/08; B27B 17/00
[52] U.S. Cl. ....................... 60/317; 30/381; 60/320; 123/41.65; 123/41.70; 181/240; 181/265
[58] Field of Search .............. 60/317, 319, 308, 298, 60/320; 181/230, 239, 240, 259, 267, 258, 265; 123/41.65, 41.70, 41.64; 173/DIG. 2; 30/381, 382

[56] References Cited

U.S. PATENT DOCUMENTS

| | | |
|---|---|---|
| 1,598,578 | 8/1926 | Maxim .................................. 181/265 |
| 2,138,001 | 11/1938 | Fluor .................................... 60/320 |
| 3,561,561 | 2/1971 | Trainor ................................ 181/267 |
| 3,581,717 | 6/1971 | Fullerton ........................... 123/41.65 |
| 3,741,730 | 6/1973 | Alcott .................................. 60/298 |
| 3,798,769 | 3/1974 | Bailey ................................ 181/240 |
| 3,914,937 | 10/1975 | Heidacker ............................ 60/320 |
| 4,060,985 | 12/1977 | Fukushima ........................... 60/319 |
| 4,142,607 | 3/1979 | Landwehr .......................... 181/240 |
| 4,231,221 | 11/1980 | Mathner .............................. 60/319 |

FOREIGN PATENT DOCUMENTS 2353722 5/1974 Fed. Rep. of Germany ...... 181/265
2929965 2/1980 Fed. Rep. of Germany ...... 181/259

Primary Examiner—Douglas Hart
Attorney, Agent, or Firm—Hubbard, Thurman, Turner & Tucker

[57] ABSTRACT

A muffler for a portable engine for a chain saw or the like including separable dish shaped members having mating peripheral edges which, when interfitted one within the other, form a hollow shell. Exhaust gas inlet and outlet openings are formed in an end wall of one of the members and a deflector member is mounted exterior of the shell and is adapted to redirect the flow of exhaust gas leaving the muffler outlet openings so that the exhaust gas flows generally in the same direction as engine cooling air flow over the engine and the muffler. A shield is mounted on the shell and has a major portion spaced from the muffler shell to form a cooling air flow passage. The separable shell members, deflector, shield and a tubular diffuser disposed within the shell are held in assembled relationship on the engine by removable threaded fasteners. An engine cooling air shroud is arranged to provide for mixing of cooling air with exhaust gases passing out of the muffler before the mixture passes through an outlet opening formed by the shroud.

20 Claims, 5 Drawing Figures

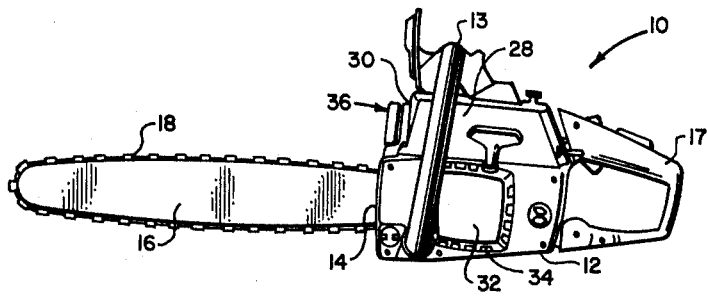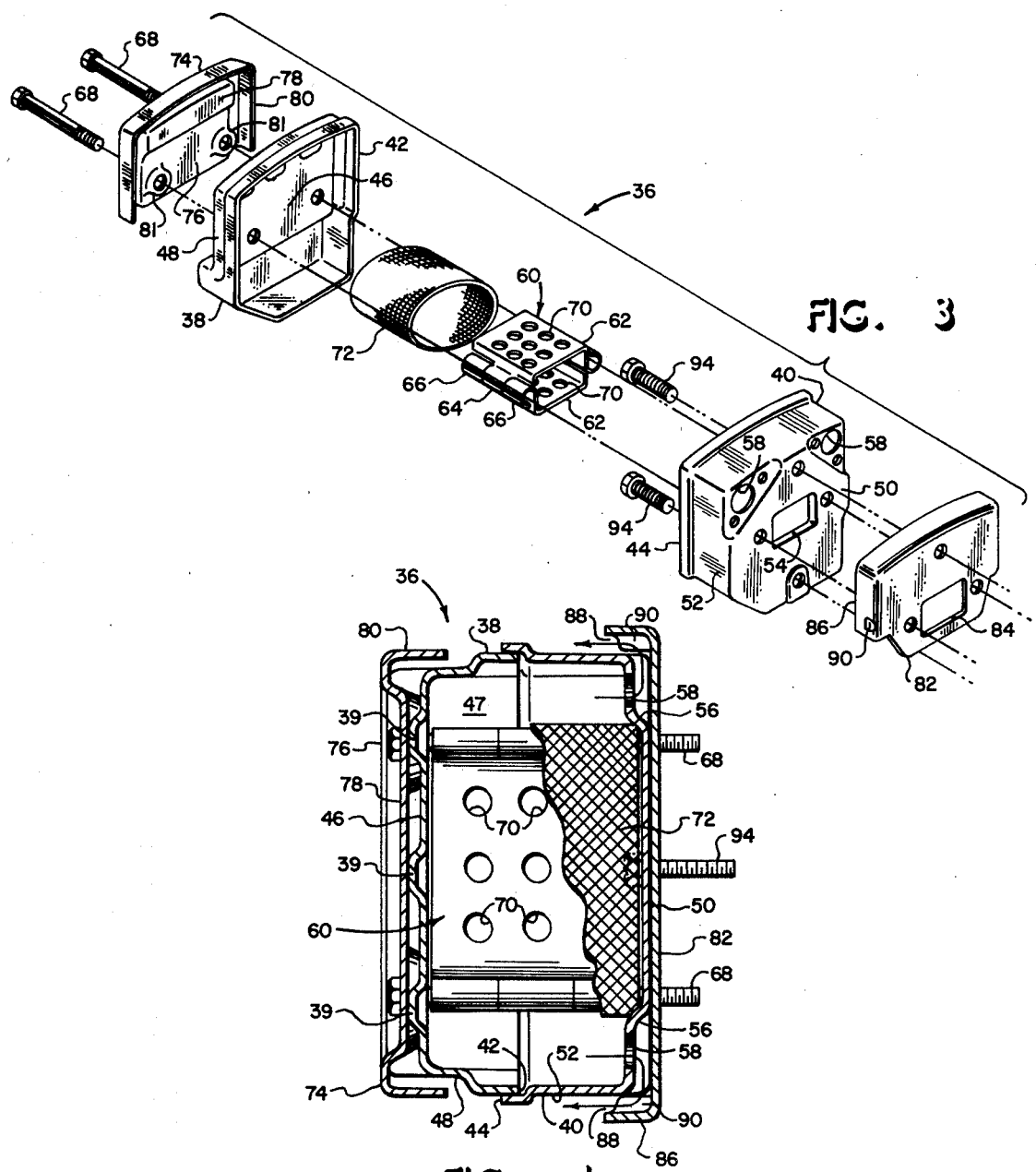

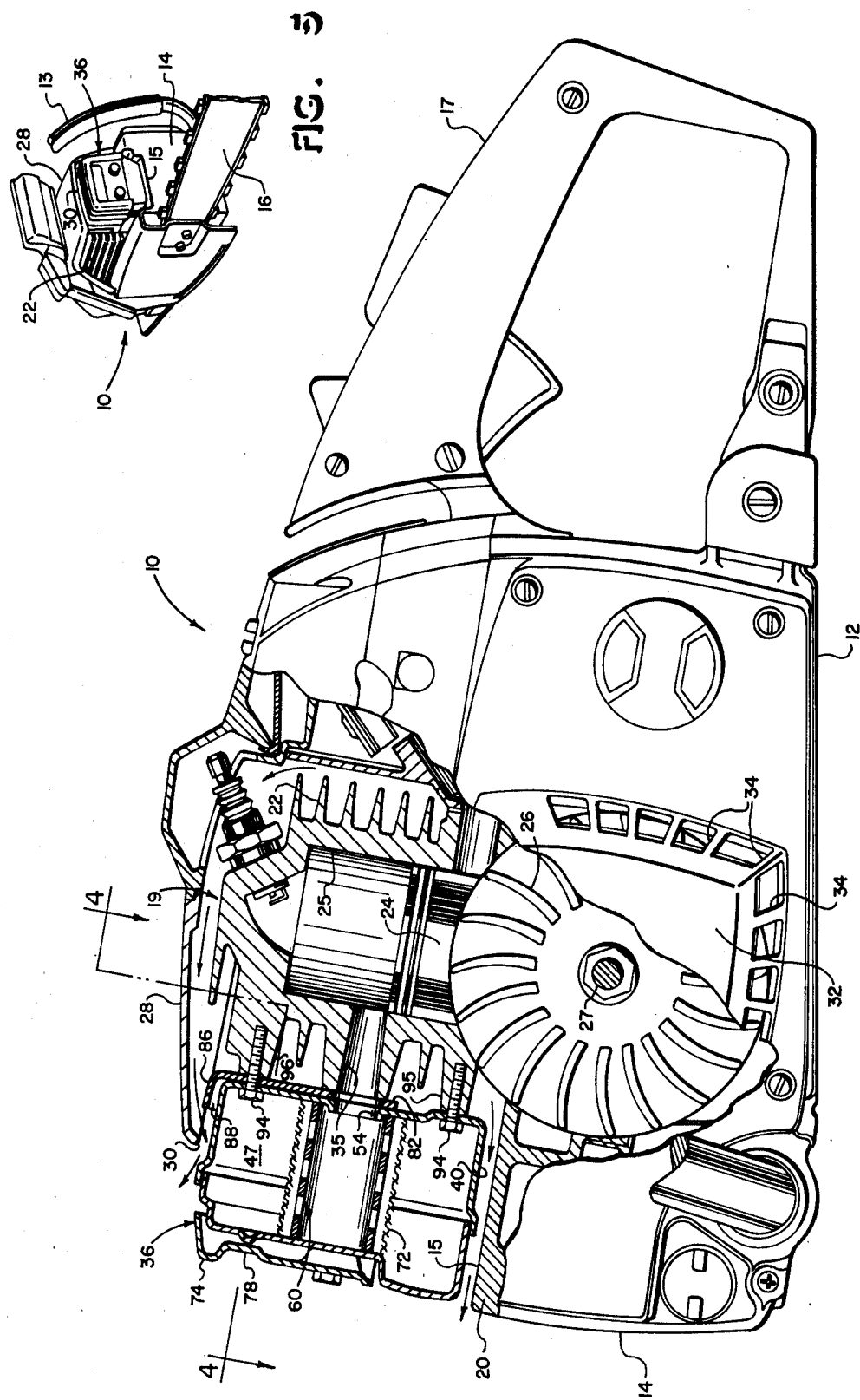

MUFFLER FOR PORTABLE ENGINE

CROSS REFERENCE TO RELATED APPLICATION

This application is a continuation-in-part of co-pending U.S. patent application Ser. No. 051,950 filed June 25, 1979, now U.S. Pat. No. 4,286,675.

BACKGROUND OF THE INVENTION

1. Field of the Invention

This invention pertains to a muffler particularly adapted for portable internal combustion engines such as used on chain saws and other portable power units.

2. Description of the Prior Art

In internal combustion engines used on portable tools and machines such as chain saws and so called power handles it is necessary to make the muffler for the engine exhaust gas as compact as possible and yet capable of providing suitable sound attenuation without reducing engine performance. Moreover, in portable power tools such as chain saws it is important and necessary that the muffler be arranged on the engine in such a way so as to direct the exhaust gas flow away from the operator and to minimize the chance of the operator being burned by direct contact with the muffler structure.

It is also important to provide mufflers for portable engines which are adapted to minimize the chance of igniting fires from direct contact of the muffler structure with objects or materials normally found in the operating environment of the engine. In this regard it has also been deemed desirable and necessary to insure that the temperature of the exhaust gas flow be reduced as much as possible immediately downstream of the muffler outlet opening.

The aforementioned desired and necessary features of mufflers for portable engine driven tools have been at best only partially obtainable with prior art muffler designs and arrangements. Furthermore, it has been generally accepted practice with heretofore known mufflers for portable internal combustion engines to provide a muffler structure which is a somewhat complex assembly of parts brazed, welded or crimped together into a unitary structure. This approach to muffler design and fabrication is not only expensive but necessitates replacement of the entire muffler structure if any damage is incurred to any portion of the muffler.

SUMMARY OF THE INVENTION

The present invention provides for an improved exhaust gas muffler for engine driven portable power tools such as chain saws and the like. In accordance with the present invention there is provided a muffler which meets substantially all of the desired performance features and yet is economical to fabricate and assemble.

The present invention also provides a muffler particularly adapted for use in a portable engine driven chain saw or other portable power unit which provides for reduced temperature of the exhaust gas flow stream as it exits the immediate vicinity of the power unit. In accordance with the present invention there is provided an arrangement of a muffler for an air cooled internal combustion engine which is disposed in the flow path of engine cooling air within a shroud disposed around a major portion of the engine cylinder.

In accordance with yet another aspect of the present invention a muffler is provided which includes an exhaust gas outlet port arranged as a slot disposed partially around the periphery of the muffler body and adapted to provide for directing the exhaust gas flow in the same direction as the engine cooling air flow. Accordingly, engine cooling air flow entrains and mixes with the exhaust gas flow to reduce the temperature of the exhaust gas before it exits the cooling air shroud. A beneficial effect of the muffler arrangement of the present invention is also realized in that the cooling air flow provides a reduced pressure in the vicinity of the muffler exhaust gas outlet to improve exhaust flow and reduce back pressure in the muffler expansion chamber.

The muffler arrangement of the present invention also includes a shield which is arranged to stand off from the muffler shell to permit cooling air flow between the shield and the muffler shell and to minimize direct contact of the shield with the muffler shell. The muffler arrangement of the present invention also provides for the muffler shield to be the only member in the vicinity of the engine cylinder which normally would come into contact with an exterior object or surface.

In accordance with yet another aspect of the present invention a muffler is provided which includes a plurality of separate parts held in assembled relationship by conventional threaded fasteners. The superior muffler design also includes a minimum number of parts, all of which are easily and economically fabricated and assembled.

The improved arrangement and structural features of the muffler of the present invention have been realized in a muffler which also provides superior sound attenuation without reducing engine performance.

BRIEF DESCRIPTION OF THE DRAWINGS

FIG. 1 is a side elevation of a portable power tool comprising an engine driven chain saw including the muffler arrangement of the present invention;

FIG. 2 is a side elevation partially sectioned of the power head portion of the unit shown in FIG. 1;

FIG. 3 is an exploded view of the parts of the muffler of the present invention;

FIG. 4 is a section view taken substantially along the lines 4—4 of FIG. 2; and

FIG. 5 is a perspective view of the engine driven saw illustrated in FIGS. 1 and 2.

DESCRIPTION OF THE PREFERRED EMBODIMENTS

The muffler arrangement of the present invention is particularly adapted for use on portable engine driven tools such as the chain saw illustrated in FIGS. 1, 2 and 5 of the drawings and generally designated by the numeral 10. The chain saw 10 includes a power head 12 having a front wall 14, from which projects a guide bar 16 for an endless chain 18. The chain saw 10 also includes forward and rear operator handles 13 and 17, respectively. The general arrangement of the power head 12 and the guide bar 16 are conventional in the art of chain saws and form no part of the present invention. Accordingly, structural details of the power head other than those necessary to understand and practice the present invention will not be described in detail.

Referring particularly to FIG. 2, the power head 12 includes an internal combustion engine 19 having a crankcase 20 and a cylinder 22. A piston 24 is disposed in a bore 25 in the cylinder 22. The engine 19 also includes a centrifugal cooling air fan 26 which is adapted to be driven by the engine crankshaft 27 in a known manner to provide for the flow of cooling air over the engine cylinder 22.

The power head 12 also includes a shroud 28 substantially enclosing the engine cylinder 22 and having an edge 30 providing an outlet opening for the exit of cooling air from the shroud after the air flows over the engine cylinder. The power head 12 also includes a shroud member 32 forming an enclosure around the fan and having cooling air inlet openings 34. Although in the specific embodiment of the power head shown in the drawings the cooling air shroud for the engine is made up of a plurality of members, it will be appreciated that various configurations of a cooling air shroud may be provided without departing from the scope or spirit of the present invention.

Referring further to FIG. 2 the engine cylinder 22 includes an exhaust port 35 disposed in the side wall of the cylinder and in communication with the bore 25 for discharging combustion gases from the bore in a known manner. The power head 12 includes an improved muffler generally designated by the numeral 36 which is mounted on the cylinder 22 and in communication with the exhaust port 35 for receiving exhaust gases from the engine 19. The muffler 36 is arranged on the power head 12 to discharge exhaust gases toward the front wall 14 and away from the operator of the saw 10. The muffler 36 is also arranged on the power head 12 in such a way that the operator, in using and carrying the saw 10, would not normally come in contact with the muffler structure. The muffler 36 is further arranged to be at least partially disposed within the interior of the shroud 28 and to have a final exhaust outlet opening disposed substantially within the interior of the shroud so that exhaust gases being discharged from the muffler are mixed with engine cooling air before exiting from the discharge opening of the shroud delimited by the edge 30.

The muffler 36 is of an improved design having a number of superior features which will be realized by those skilled in the art upon reading the following description in conjunction with FIGS. 2, 3 and 4 of the drawings. Referring particularly to FIGS. 3 and 4 the muffler 36 is characterized by a pair of dish shaped members 38 and 40 which include respective peripheral edges 42 and 44 adapted to be interfitted to form a hollow shell having an interior portion forming an expansion chamber 47. The member 38 includes an end wall 46 and a stepped peripheral side wall 48. The member 40 also includes an end wall 50 and a peripheral side wall 52. The end wall 50 includes an exhaust gas inlet opening 54 and two spaced apart recessed portions 56 having respective exhaust gas outlet openings 58 formed therethrough.

The muffler 36 also includes a generally rectangular tubular diffuser member, generally designated by the numeral 60, which is adapted to be mounted within the expansion chamber 47 and extending substantially from the end wall 50 to the end wall 46. The diffuser 60 is preferably made up of separate members 62 which are provided with integral rolled tubular portions 64 and 66 to provide for interfitting the members 62 to form a rectangular enclosure. The diffuser 60 is retained in position within the expansion chamber 47 by elongated mounting screws 68 which extend through the rolled portions 64 and 66, as shown in FIG. 4. The diffuser 60 also includes a plurality of holes 70 in each of the members 62 through which exhaust gases are diffused into the expansion chamber 47. An oval spark arrestor screen 72 is adapted to be disposed around the diffuser 60 for further diffusing the exhaust gases flowing into the expansion chamber 47 and for containing particulate matter being discharged through the exhaust port 35.

The muffler 36 also includes a member comprising a shield 74 having an end wall 76, in which is formed an elongated depression 78. The shield 74 also includes a peripheral side wall or skirt 80 extending around three sides of the end wall 76. The shield 74 is adapted to be mounted on the end wall 46 of the member 38 and to stand off from the end wall thanks to the provision of the raised portions 39 which engage the depressed portion 78. Accordingly, a major portion of the shield 74 is spaced from the end wall 46 to form passages for the flow of cooling air between the shield and the member 38. The shield 74 also includes a pair of spaced apart bosses 81 having suitable openings therein for the muffler mounting screws 68. As will be noted from FIGS. 2 and 4 the peripheral skirt 80 of the shield 74 is formed to be substantially flush with the contour of the muffler shell formed by the members 38 and 40. However, the skirt 80 is adapted to be spaced from the stepped side wall 48 to provide for further circulation of cooling air between the shield and the portion of the muffler shell formed by the member 38.

The muffler 36 further comprises a deflector member 82 adapted to be mounted between the member 40 and the engine cylinder 22. The member 82 includes a generally rectangular opening 84 adapted to be aligned with the opening 54 in the member 40. The deflector member 82 also includes a peripheral side wall portion 86 extending substantially around three sides of the deflector 82. As shown in FIGS. 2 and 4 the deflector 82 is adapted to redirect the flow of exhaust gases through the openings 58 so that the gases exit from the muffler 36 through a peripheral slot 88 formed between the side wall 52 of the member 40 and the peripheral side wall 86 of the deflector 82. This arrangement of the outlet opening for the muffler advantageously provides for a final exit of exhaust gases from the muffler which is closely adjacent to the engine cylinder and is directed away from the engine in the direction of the cooling air flow around the engine cylinder. Moreover, the arrangement of the exhaust inlet opening 54 and the exhaust outlet opening 58 being in the same end wall of the muffler shell provides for substantial redirection of the exhaust gas flow path which enhances the sound attenuation capability of the muffler 36. The deflector 82 is further conveniently provided with opposed depressions 90 in the peripheral side wall 86 which assists in locating the deflector with respect to the member 40 when the muffler is being assembled to the engine cylinder 22.

The muffler 36 is advantageously formed of a plurality of sheet metal stampings comprising the members 38, 40, 74 and 82 which are adapted to be held in assembly on the engine 19 by conventional threaded fasteners. Referring to FIG. 2, in a preferred arrangement the member 40 and the deflector 82 are secured to the cylinder 22 by threaded fasteners 94 suitably threaded into tapped holes in laterally projecting bosses 95 and 96 which are formed integral with the cylinder 22. The member 38 together with the shield 74 and the diffuser 60 are suitably retained in assembly with the members 40 and 82 on the cylinder 22 by the screws 68 which are also threaded into tapped holes, not shown, in a flange 98 of the cylinder formed around the exhaust port 34. Accordingly, the muffler 36 may be easily disassembled for replacement of any one of the muffler parts, and furthermore, the muffler 36 is more economically fabricated than mufflers which are made of separate parts welded or crimped together into a unitary assembly.

The muffler arrangement of the present invention also advantageously provides for reducing the temperature of the exhaust gas flowing from the muffler in the vicinity of the power head 12. Referring to FIG. 2, it may be seen that the slot 88 forming the outlet for exhaust gas flowing from the muffler 36 is disposed substantially within the enclosure formed by the shroud 28. Moreover, the deflector 82 is formed to provide for the direction of flow of the exhaust gas leaving the slot 88 to be the same as the direction of flow of cooling air exiting through the opening formed by the edge 30 and as indicated by the arrows in FIG. 2. Therefore, the flow of cooling air over the peripheral side wall 86 of the deflector and past the slot 88 provides for entraining the flow of exhaust gas which contributes to reducing the exhaust gas back pressure within the muffler 36. Although, as shown in FIG. 5, the shroud 28 is cut away to some extent on one side of the cylinder 22 a curtain of cooling air flow substantially surrounds the muffler 36 to mix with the exhaust gas and direct the flow of exhaust gas forwardly away from the operator of the saw 10. In fact, the muffler is bathed in cooling air flow on substantially all sides thereof thanks to the arrangement whereby the muffler is disposed at least partially within the enclosure formed by the shroud 28 and the top wall 15 of the crankcase 14.

A further advantageous aspect of the present invention is realized in accordance with the arrangement whereby the muffler 36 is substantially recessed with respect to the front wall 14 of the crankcase 20, and the muffler is provided with the shield 74 which stands off substantially from the muffler shell. The shield 74 is adapted to reduce convection heating of the shield surface and to provide for flow of cooling air between the end wall of the muffler shell and the shield itself. This arrangement of the muffler minimizes the chance of scorching or ignition of objects which might inadvertently come into contact with the shield.

As will be appreciated from the foregoing description the muffler 36 together with its arrangement on the power head 12 enjoys a number of superior features and advantages which those skilled in the art will recognize. Modifications, deletions, substitutions and other changes not specifically described and illustrated herein may be carried out to achieve the objects of the present invention and fall within the scope and spirit of the appended claims.

What I claim is:

1. A muffler for an internal combustion engine driven hand held power tool, said tool including an engine having a cylinder and an exhaust port in said cylinder, and a cooling air fan, said muffler being adapted to be mounted in a cooling air flowstream provided by said fan, said muffler being characterized by:
a hollow shell having spaced apart endwalls and a peripheral sidewall contiguous with said endwalls to form an expansion chamber;
an opening in one of said endwalls forming a muffler inlet port arranged to be in communication with said exhaust port;
means forming an exhaust gas outlet opening in said shell; and
an exhaust gas deflector disposed on said muffler in relation to said outlet opening in said shell and cooperable with said sidewall of said shell to form a flow passage for exhaust gas exiting said shell whereby the direction of flow of exhaust gas is generally in the same direction as the exhaust gas flow into said muffler from said exhaust port, said deflector including a wall portion spaced from said sidewall of said shell to direct the flow of exhaust gas over at least a portion of said shell and in the same direction as said cooling air for mixing with said cooling air to cool said exhaust gases and said shell.

2. The invention set forth in claim 1 wherein:
said shell is mounted on said cylinder and said deflector is disposed between said shell and said cylinder.

3. The invention set forth in claim 2 wherein:
said muffler includes a shield mounted on said shell and having a major portion thereof standing off from the other of said end walls to form a space for cooling air to flow between said other end wall and said shield.

4. The invention set forth in claim 1 wherein:
said engine includes a shroud disposed around said engine for causing cooling air to flow around said cylinder and across said shell, said shroud extending to a point to provide for cooling air to mix with exhaust gas flowing out of said passage before said cooling air and said exhaust gas mixture exit from said shroud.

5. The invention set forth in claim 3 together with:
removable fastening means for securing said shell, said shield and said deflector to said cylinder.

6. The invention set forth in claim 3 wherein:
said muffler includes a tubular diffuser member disposed in said shell and in communication with said exhaust port, a plurality of holes formed in the wall of said diffused member for diffusing exhaust gas into the interior of said shell, and a spark arrestor screen disposed around said diffuser member between said diffuser member and said expansion chamber.

7. In a portable engine driven unit:
an internal combustion engine including a cylinder and an exhaust port for said cylinder;
an engine driven cooling fan;
a shroud disposed around said engine and including means defining an outlet for cooling air flow discharged by said fan;
a muffler mounted on said engine and disposed at least partially in said outlet in said shroud in the path of cooling air flow and in communication with said exhaust port for receiving exhaust gases from said cylinder, said muffler including means forming a hollow shell defining an expansion chamber, said shell having first and second spaced apart endwalls interconnected by a sidewall, means forming an opening in said shell for discharging exhaust gases from said chamber, means forming a deflector and positioned in relation to said opening to redirect the flow of exhaust gas exiting said shell, said deflector including a portion disposed adjacent said sidewall and spaced therefrom to form a slot along at least a portion of said sidewall for discharging exhaust gases from said muffler to flow over the exterior of said shell in substantially the same direction as the flow of cooling air, said deflector being disposed within an enclosure formed by said shroud in such a way that exhaust gases exiting said muffler mix with cooling air discharged by said fan and flow over said shell before flowing out of said outlet in said shroud.

8. The invention set forth in claim 7 wherein:
said deflector is a separate part mounted between said shell and said cylinder.

9. The engine driven unit set forth in claim 7 wherein:
said muffler includes an opening in one of said endwalls for receiving exhaust gas from said cylinder and said means forming said opening in said shell discharging exhaust gases from said chamber is positioned with respect to said opening in said one endwall such that exhaust gases flowing through said shell undergo a reverse direction of flow with respect to the flow direction upon entering said shell and said exhaust gases then undergo a second reverse direction of flow upon redirection by said deflector.

10. The engine driven unit set forth in claim 7 or 9 wherein:
said engine driven unit comprises a work performing member projecting from one end of said engine driven unit, and said cooling air and exhaust gas mixture exit said shroud to flow in the direction of extension of said work performing member from said engine driven unit and away from an operator for said engine driven unit.

11. The engine driven unit set forth in claim 10 wherein:
said work performing member comprises a guide bar for a saw chain driven by said engine unit and said muffler projects from said shroud toward said guide bar and is substantially flush with a front transverse wall of said engine whereby the location of said muffler in the use of said saw minimizes the chance of engagement of said muffler with combustible material and the operator of said saw.

12. The engine driven unit set forth in claim 9 wherein:
said muffler includes a shield mounted on the other of said endwalls and formed such that a major portion of said shield stands off from said other endwall to define a space between said shield and said other endwall through which air may flow to reduce the surface temperature of said shield.

13. The engine driven unit set forth in claim 12 wherein:
said shell is characterized by a first dish shaped member and a second dish shaped member opposed to and engaged with said first member along respective cooperating peripheral edge portions to form an enclosure defining an expansion chamber, said members being secured together and to said shield by removable fastener means.

14. The engine driven unit set forth in claim 12 wherein:
said shield includes a skirt portion formed thereon and cooperable with said shell to form an elongated slot substantially flush with said sidewall of said shell whereby the flow of an exhaust gas-cooling air mixture over said sidewall passes over said elongated slot.

15. A muffler for an internal combustion engine, said muffler comprising:
means defining a hollow shell forming an expansion chamber, said shell including spaced apart endwalls and a peripheral sidewall, one of said endwalls including an inlet opening adapted to be in communication with an engine exhaust port for admitting exhaust gases to said chamber;
a shield mounted on the other of said endwalls and formed such that a major portion of said shield stands off from said other endwall to define a space between said shield and said other endwall through which air may flow to reduce the surface temperature of said shield;
an exhaust gas outlet opening in said shell disposed at a point on said shell remote from said shield;
means forming a deflector disposed adjacent said outlet opening whereby exhaust gases exiting said shell through said outlet opening are redirected by said deflector through a first slot formed by said deflector and the sidewall of said shell; and
said shield includes a skirt portion formed thereon and cooperable with said shell to form a second slot substantially flush with said sidewall of said shell whereby exhaust gas exiting said first slot flows over said sidewall and said second slot.

16. A muffler adapted to be mounted on an internal combustion engine in communication with an exhaust port for said engine, said muffler comprising:
first and second substantially dish shaped members formed with mating peripheral edges whereby said members may be assembled together to form a hollow shell, a shield adapted to be mounted on one of said members to form a space between said shield and said one member, the other of said members including an endwall having an inlet opening adapted to be in communication with said exhaust port, exhaust outlet openings disposed in a recessed portion of said endwall, a deflector adapted to be mounted between said other member and said engine for redirecting the flow of exhaust gas exiting said hollow shell through said exhaust outlet openings, and removable fastening means for securing said members and said shield in assembled relationship on said engine.

17. The invention set forth in claim 16 wherein:
said deflector is a separate part adapted to be removably mounted between said other member and said engine.

18. The invention set forth in claim 16 wherein:
said dish shaped members, said shield, and said deflector are each formed as separate sheet metal stampings.

19. A muffler adapted to be mounted on an internal combustion engine in communication with an exhaust port for said engine, said muffler comprising:
first and second substantially dish shaped members formed with mating peripheral edges whereby said members may be assembled together to form a hollow shell, a shield adapted to be mounted on one of said members to form a space between said shield and said one member, the other of members including an endwall having an inlet opening adapted to be in communication with said exhaust port, exhaust /outlet openings in said other member, a deflector adapted to be mounted between said other member and said engine for redirecting the flow of exhaust gas exiting said hollow shell through said exhaust outlet openings, a tubular diffuser adapted to be removably disposed in said hollow shell and in communication with said exhaust port, and removable fastening means for securing said members and said shield in assembled relationship on said engine, said fastening means being engageable with said diffuser for retaining said diffuser in a substantially fixed position within said hollow shell.

20. The invention set forth in claim 19 together with a spark arrestor screen disposed around said diffuser and removably retained between opposed respective endwalls of said dish shaped members.

* * * * *